Patented Jan. 16, 1934

1,943,346

UNITED STATES PATENT OFFICE 1,943,346

METHOD OF PREPARING REGENERATED CELLULOSE STRUCTURES

Waldemar Schwalbe, Wiesbaden, and Otto Schnecko, Biebrich-on-the-Rhine, Germany, assignors to Kalle & Co. Aktiengesellschaft, Wiesbaden-Biebrich, Germany, a corporation of Germany No Drawing. Application June 30, 1931, Serial No. 548,032, and in Germany July 11, 1930

2 Claims. (Cl. 18—57)

This invention relates to sheets, films, tubes, caps and bands formed of opaque or turbid regenerated cellulose and to the method of making the same.

Prior to this invention, opaque and turbid structures of regenerated cellulose having relatively large and/or flat surfaces such as, for example, sheets, films, caps, tubes and bands, were prepared by incorporating pigments, such as barium sulphate and talcum powder in viscose solution, and then extruding or forming the solution in the well-known manner to produce the desired article. To secure a satisfactory opaquing, it was necessary to use such a quantity of pigment that the strength of the product was very low, especially in the wet condition.

We have found that we can produce turbid or opaque regenerated cellulose articles of the type mentioned which possess a strength considerably greater than has heretofore been produced by incorporating a titanium compound, such as titanic acid or titanium oxide alone or in admixture with other pigments in a viscose solution, preferably at some stage in the preparation thereof, and then molding, i. e., extruding or forming, the solution to produce the desired article.

It is therefore an object of this invention to provide opaque or turbid regenerated cellulose structures which have relatively large and/or flat surfaces, such as sheets, films, tubes, caps and bands which are stronger than similar opaque regenerated cellulose structures previously prepared.

Another object of this invention is to provide a method of producing opaque regenerated cellulose structures having relatively large and/or flat surfaces, such as opaque sheets, films, tubes, caps and bands.

Other objects will appear from the following description and appended claims.

The present invention, as evidenced by the foregoing objects, contemplates the production of articles having relatively large and/or flat surfaces, such as sheets, films, tubes, caps and bands, of opaque or turbid regenerated cellulose which are characterized by a strength considerably greater than those previously secured. In accordance with the principles of this invention, this is secured by incorporating in a viscose solution, prior to molding and preferably at some stage in the preparation thereof, an opaquing substance, specifically a titanium compound such as titanic acid, titanium oxide or a pigment containing the same, as, for example, titanium white, either alone or in combination with other pigments or fillers.

The titanium compound is characterized by a high opaquing value and hence a relatively small quantity thereof is utilized. The quantity of the titanium compound used in the production of articles having relatively large and/or flat surfaces is a fraction of the quantity of fillers previously used.

Because of the comparatively small amount of filler in the opaque or turbid films and the like, to which the instant invention relates, the strength of the product especially in the wet state is not materially reduced. In fact, the wet strength of articles produced by this invention is considerably greater than that of similar articles prepared by the methods employed prior to this invention.

The wet strength is of prime importance in those articles which are used in the wet state. For example, in materials having relatively large surfaces, such as caps or casings which are utilized in the wet state, it is an essential feature. The greater the strength the more effectively will the product withstand and resist destruction during use and application, with the result that the waste will be materially reduced and the product more economical.

The titanium compound may be added to the viscose solution at any time before molding, i. e., extruding or forming. However, in order that it may be substantially uniformly and homogeneously distributed throughout the mass, it is advisable to incorporate the titanium compound in the viscose solution at some stage in the method of preparing it. For example, the titanium compound may be previously dispersed or distributed in the solution used for dissolving the xanthate.

In order to more clearly explain the invention, the following four examples illustrating four modifications which have given satisfactory results are set forth:

*Example I.*—A viscose with 6% cellulose and 1% titanic white is extruded in a coagulating bath containing ammonium sulfate in the usual way to form films. The films obtained are just as opaque as films produced from a viscose with 6% cellulose and 4% barium sulfate. However, they are considerably stronger, particularly when wet.

*Example II.*—A viscose with 6% cellulose is produced with a content of 0.3% titanium white and is passed from a ring-shaped spinneret into an ammonium sulfate bath. A fairly opaque tube is obtained which when wet has nearly the same tenacity as a tube produced from viscose without a filler.

*Example III.*—2 parts by weight of talcum and 0.5 part by weight of titanium white are uniformly distributed in 100 parts by weight of viscose with 6% cellulose. Shrinking caps are produced from the viscose in the usual way. After drying, these caps show the same luster as caps produced from a viscose with 6% cellulose and 4% talcum. However, they have a greater covering power and possess greater strength both in the dry and wet states than similar products resulting from an analogous viscose containing only 4% talcum.

*Example IV.*—A viscose with 6% cellulose and an addition of 1% barium sulfate and a quantity of titanic acid equivalent to 1% titanium oxide is manufactured into shrinking caps in the usual way. The material constituting the caps has a covering power somewhat better than caps made from a comparative viscose with an addition of 4% barium sulfate and in addition is stronger.

It is to be understood that the invention is not restricted to the precise proportions set forth in the preceding examples since it is obvious that the proportions of the ingredients may vary within wide limits, depending on the degree of turbidity or opacity desired.

Since it is obvious that various changes may be made by one skilled in the art without departing from the nature or spirit of the invention, the invention is not limited to the specific details described, except as defined in the appended claims.

We claim:

1. A method of producing opaque or turbid sheets, films, tubes, caps and bands without appreciably decreasing the strength thereof which comprises molding a viscose solution containing titanic acid in the known manner.

2. A method of producing opaque or turbid sheets, films, tubes, caps and bands which comprises incorporating a titanic acid in a viscose solution at some stage in the preparation of the same and molding the resulting mass in the usual manner.

WALDEMAR SCHWALBE.
OTTO SCHNECKO.